United States Patent
Xiao (10) Patent No.: US 12,531,302 B2
(45) Date of Patent: Jan. 20, 2026

(54) TOP COVER ASSEMBLY, SECONDARY BATTERY, BATTERY MODULE, AND ELECTRICITY-CONSUMPTION DEVICE

(71) Applicant: Hithium Tech HK Limited, HongKong (CN)

(72) Inventor: Hepan Xiao, Guangdong (CN)

(73) Assignee: HITHIUM TECH HK LIMITED, HongKong (CN)

( * ) Notice: Subject to any disclaimer, the term of this patent is extended or adjusted under 35 U.S.C. 154(b) by 0 days.

(21) Appl. No.: 18/911,196

(22) Filed: Oct. 9, 2024

(65) Prior Publication Data
US 2025/0149697 A1    May 8, 2025

(30) Foreign Application Priority Data

Nov. 7, 2023  (CN) .................. 202311464856.X (51) Int. Cl.
| | |
|---|---|
| *H01M 50/188* | (2021.01) |
| *H01M 50/15* | (2021.01) |
| *H01M 50/176* | (2021.01) |
| *H01M 50/184* | (2021.01) |

(52) U.S. Cl.
CPC ......... *H01M 50/188* (2021.01); *H01M 50/15* (2021.01); *H01M 50/176* (2021.01); *H01M 50/184* (2021.01)

(58) Field of Classification Search
None
See application file for complete search history.

(56) References Cited

U.S. PATENT DOCUMENTS

2013/0004832 A1    1/2013   Kim et al.

FOREIGN PATENT DOCUMENTS

| CN | 207265118 U | 4/2018 |
|---|---|---|
| CN | 209747570 U | 12/2019 |
| CN | 211879410 U | 11/2020 |
| CN | 112271412 A | 1/2021 |
| CN | 113745720 A | 12/2021 |
| CN | 215578771 U | 1/2022 |
| CN | 216958254 U | 7/2022 |
| CN | 218005056 U | 12/2022 |

(Continued)

OTHER PUBLICATIONS

Machine translation of CN 116435721 A.*

(Continued)

*Primary Examiner* — Jonathan G Leong
*Assistant Examiner* — Tony S Chuo (57) ABSTRACT

Provided are a top cover assembly, a secondary battery, a battery module, and an electricity-consumption device. The top cover assembly includes a top cover plate, a lower plastic component, a pole, an upper plastic component, a press ring, and a seal ring. A first pole hole is formed at the top cover plate. A second pole hole is defined in the lower plastic component. In a thickness direction of the top cover plate, a surface of the seal ring sealingly abuts against the top cover plate, and another surface of the seal ring sealingly abuts against the press ring. An inner side wall of the seal ring sealingly abuts against an outer peripheral wall of the pole or a side wall of an insertion portion, and an outer wall sealingly abuts against a hole wall of the second pole hole.

6 Claims, 9 Drawing Sheets

(56) References Cited

FOREIGN PATENT DOCUMENTS

| | | |
|---|---|---|
| CN | 218005057 U | 12/2022 |
| CN | 115692969 A | 2/2023 |
| CN | 218975619 U | 5/2023 |
| CN | 219067009 U | 5/2023 |
| CN | 116435721 A | 7/2023 |
| CN | 116526084 A | 8/2023 |
| CN | 116799396 A | 9/2023 |
| CN | 116960539 A | 10/2023 |
| CN | 117219933 A | 12/2023 |
| JP | 2010170920 A | 8/2010 |
| JP | 2016001536 A | 1/2016 |
| JP | 2019096594 A | 6/2019 |
| JP | 2020035581 A | 3/2020 |
| JP | 2021015709 A | 2/2021 |
| WO | 2022077904 A1 | 4/2022 |
| WO | 2023151320 A1 | 8/2023 |

OTHER PUBLICATIONS

The First Office Action from corresponding Chinese Application No. 202311464856.X dated Dec. 20, 2023. English translation attached.
The Grant Notice from corresponding Chinese Application No. 202311464856.X dated Jan. 10, 2024. English translation attached.
Extended European Search Report dated Mar. 17, 2025 received in corresponding European Application No. EP24211106.0.
International Search Report dated Nov. 18, 2024 in International Application No. PCT/CN2024/112833. English translation attached.
Written Opinion dated Nov. 18, 2024 in International Application No. PCT/CN2024/112833. English translation attached.

\* cited by examiner

TOP COVER ASSEMBLY, SECONDARY BATTERY, BATTERY MODULE, AND ELECTRICITY-CONSUMPTION DEVICE

RELATED APPLICATION

This application claims priority to Chinese patent application No. 202311464856.X filed on Nov. 7, 2023, the entire content of which is incorporated herein by reference.

FIELD

The present disclosure relates to the technical field of electricity-consumption devices, and more particularly, to a top cover assembly, a secondary battery, a battery module, and an electricity-consumption device.

BACKGROUND

A secondary battery, also known as a rechargeable battery or a storage battery. By activating an active material through charging, the secondary battery can continue to be used after having been discharged.

In the related art, the secondary battery includes a top cover assembly. The top cover assembly includes a top cover plate, a pole, an upper plastic component, and a lower plastic component. The upper plastic component and the lower plastic component are disposed at opposite sides of the top cover plate and are configured to insulate the pole. However, in a process of mounting the lower plastic component to the top cover plate, due to poor sealing between the lower plastic component and the pole, metal debris may easily fall off, which causes a short circuit in the pole and/or the top cover plate, thus affecting the operation performance of the secondary battery.

SUMMARY

In response to the above shortcomings in the related art, the present disclosure provides a top cover assembly, a secondary battery, a battery module, and an electricity-consumption device, which improve sealing between the lower plastic component and the pole, thereby avoiding a short circuit in the pole and the top cover assembly due to metal debris falling off, so as to improve the operation performance of the secondary battery.

To solve the above technical problems, in a first aspect, the present disclosure provides a top cover assembly. The top cover assembly includes: a top cover plate having a first surface and a second surface facing away from each other in a thickness direction of the top cover plate, the top cover plate being provided with a first pole hole passing through the first surface and the second surface; a lower plastic component stacked on the second surface, a second pole hole coaxial with the first pole hole being defined in the lower plastic component, the second pole hole having a greater diameter than that of the first pole hole; a pole sequentially passing through the first pole hole and the second pole hole; an upper plastic component including a connection portion and an insertion portion that are connected to each other, the connection portion being disposed on the first surface, and the insertion portion being arranged between the pole and an inner sidewall of the first pole hole; a press ring, a hole wall of a through hole of the press ring surrounding an end portion of the pole extending out of the second pole hole, and the press ring abutting against a surface of the lower plastic component facing away from the top cover plate; and a seal ring disposed in the second pole hole, in the thickness direction of the top cover plate a surface of the seal ring sealingly abutting against the top cover plate, and another surface of the seal ring sealingly abutting against the press ring; an inner side wall of the seal ring sealingly abutting against an outer peripheral wall of the pole or a side wall of the insertion portion, and an outer side wall of the seal ring sealingly abutting against a hole wall of the second pole hole.

The pole passes through the first pole hole and the second pole hole. The diameter of the second pole hole is greater than the diameter of the first pole hole, and the press ring is arranged around the end portion of the pole extending out of the second pole hole. Therefore, the top cover plate, the surface of the press ring facing towards the top cover plate, the outer peripheral wall of the pole or the side wall of the insertion portion of the pole, and the hole wall of the second pole hole form a mounting space for mounting the seal ring. In addition, one surface of the seal ring sealingly abuts against the top cover plate and another surface of the seal ring sealingly abuts against the press ring, the inner side wall of the seal ring sealingly abuts against the outer peripheral wall of the pole or the side wall of the insertion portion, and the outer side wall of the seal ring sealingly abuts against the hole wall of the second pole hole. Therefore, the mounting space can be peripherally sealed. In contrast, in the manner in which the seal ring has one surface sealingly abutting against the top cover plate and another surface sealingly abutting against the press ring, insulation and sealing between the press ring and the top cover plate can be realized, but it is difficult to ensure sealing between the hole wall of the second pole hole and the seal ring and between the seal ring and the pole, such that metal debris easily falls into the gap between the seal ring and the pole in a process of welding the press ring, resulting in a short circuit of the pole. Therefore, by sealingly abutting the inner side wall of the seal ring against the outer peripheral wall of the pole or the side wall of the insertion portion, and sealingly abutting the outer side wall of the seal ring against the hole wall of the second pole hole, insulation and sealing between the top cover plate and the press ring can be realized in an axial direction of the first pole hole, and insulation and sealing between the second pole hole and the pole can be realized in a radial direction of the first pole hole, such that the short circuit in the pole and the top cover plate due to metal debris can be avoided, which improves the operation performance of the secondary battery.

In a second aspect, the present disclosure provides a secondary battery. The secondary battery includes: a housing including an accommodation cavity having an opening; an electrode assembly mounted in the accommodation cavity; and the top cover assembly of the first aspect. The opening is covered by the top cover assembly.

Because the secondary battery includes the top cover assembly in the first aspect, and the top cover plate and pole in the top cover assembly have good insulation, the service performance of the secondary battery is improved.

In a third aspect, the present disclosure further provides a battery module including at least one secondary battery according to the second aspect.

Since the battery module includes the secondary battery in the second aspect, the battery module has better performance.

In a fourth aspect, the present disclosure further provides an electricity-consumption device including the battery module of the third aspect.

Since the electricity-consumption device includes the battery module in the third aspect, a power function of the electricity-consumption device is enhanced.

BRIEF DESCRIPTION OF THE DRAWINGS

In order to clearly explain technical solutions in the embodiments of the present disclosure, drawings used in the description of the embodiments are briefly described below. Obviously, the drawings as described below are merely some embodiments of the present disclosure. Based on these drawings, other drawings can be obtained by those skilled in the art without creative effort.

DESCRIPTION OF REFERENCE NUMERALS 100, top cover assembly; 110, top cover plate; 111, first surface; 112, second surface; 113, first pole hole; 114, lock tab; 115, avoidance groove; 116, transition recess; 120, lower plastic component; 121, second pole hole; 1211, large end hole; 1212, small end hole; 122, lock latch; 1221, neck; 1222, lock protrusion; 123, boss; 1231, avoidance slot; 130, pole; 140, upper plastic component; 141, connection portion; 142, insertion portion; 150, press ring; 151, embed slot; 160, seal ring; 161, first protrusion; 162, second protrusion; 163, lap-joint protrusion;
200, secondary battery; 210, housing; 220, electrode assembly;
300, battery module;
400, electricity-consumption device.

DETAILED DESCRIPTION

Technical solutions of embodiments of the present disclosure will be clearly and completely described below in conjunction with accompanying drawings in the present disclosure. Obviously, the embodiments described below are only part of the embodiments of the present disclosure and are not all embodiments of the present disclosure. Based on the embodiments of the present disclosure, other embodiments obtained by those skilled in the art without creative labor are within scope of the present disclosure.

In the present disclosure, the orientation or position relationship indicated by the terms such as "upper", "lower", "left", "right", "front", "rear", "top", "bottom", "inner", "outer", "vertical", "horizontal", "transverse", and "longitudinal" may be construed to refer to the orientation or the position as shown in the drawings. The terms are primarily used to better describe the present disclosure and the embodiments thereof, rather than limiting that the indicated devices, elements, or components must have a specific orientation, or be constructed and operated in a specific orientation.

Moreover, some of the above terms may be used to indicate other meanings besides orientation or position. For example, the term "upper" may further be used to indicate some dependence or connection relationship in some cases. For those skilled in the art, the specific meanings of these terms in the present disclosure can be understood according to specific circumstances.

In addition, the terms such as "installed", "disposed", "provided", "connected", and "coupled" may be understood in a broad sense. For example, it may be a fixed connection or a detachable connection or connection as one piece; mechanical connection or electrical connection; direct connection or indirect connection through an intermediate; or internal communication between two devices, elements, or components. For those of ordinary skill in the art, the specific meaning of the above-mentioned terms in the present disclosure can be understood according to specific circumstances.

Additionally, the terms "first", "second" and the like are primarily used to distinguish different devices, elements, or components (which may or may not be of the same kind and configuration) and are not intended to indicate or imply the relative importance or a number of the indicated devices, elements, or components. Unless otherwise specifically defined, "plurality" means at least two.

As described in the background of the present disclosure, in the related art, the secondary battery includes a top cover assembly. The top cover assembly includes a top cover plate, a pole, an upper plastic component, and a lower plastic component. The upper plastic component and the lower plastic component are respectively arranged at opposite sides of the top cover plate for insulating the pole. However, in a process of mounting the lower plastic component to the top cover plate, due to poor sealing between the lower plastic component and the pole, metal debris may easily fall off, which causes a short circuit in the pole and/or the top cover plate, thus affecting the operation performance of the secondary battery.

In order to solve the technical problems mentioned in the background, the present disclosure provides a top cover assembly, a secondary battery, a battery module, and an electricity-consumption device. A seal ring is provided in the top cover assembly. A surface of the seal ring sealingly abuts against the top cover plate, and another surface of the seal ring sealingly abuts against the press ring in a thickness direction of the top cover plate. An inner side wall of the seal ring sealingly abuts against an outer peripheral wall of the pole or a side wall of an insertion portion. An outer side wall of the seal ring sealingly abuts against a hole wall of a second pole hole. Therefore, the sealing effect between the second pole hole and the pole is improved, avoiding a short circuit in the pole and the top cover plate due to metal debris falling off, which improves the operation performance of the secondary battery.

The present disclosure is described in detail below through specific embodiments.

Figure 1:
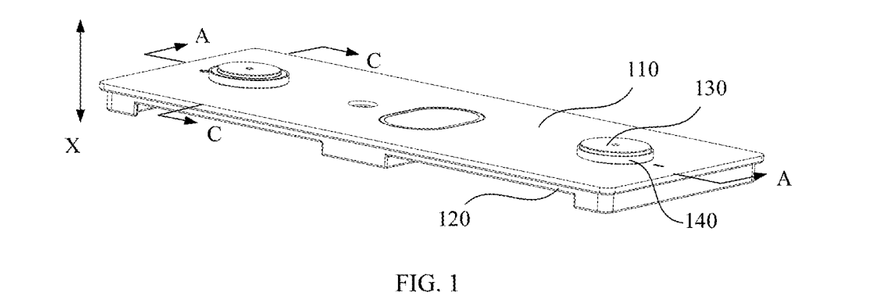
FIG. 1 is a schematic view of a structure of a top cover assembly according to an embodiment of the present disclosure.
Figure 2:
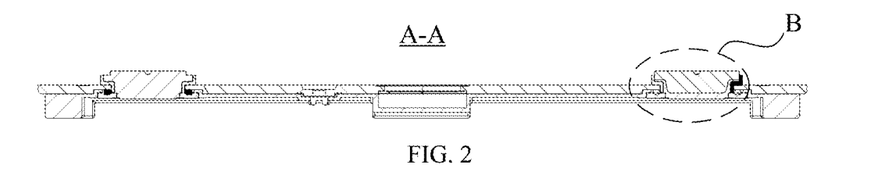
FIG. 2 is a cross-sectional view taken along A-A in FIG. 1.
Figure 3:
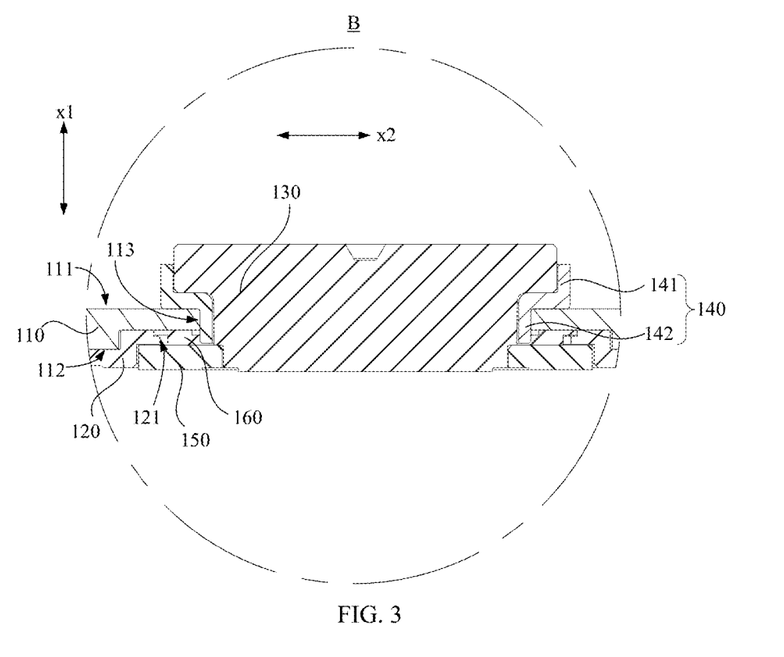
FIG. 3 is a first partially enlarged schematic view of part B in FIG. 2.

Referring to FIG. 1, FIG. 2, and FIG. 3, the embodiments of the present disclosure provides a top cover assembly 100. The top cover assembly 100 includes a top cover plate 110, a lower plastic component 120, a pole 130, an upper plastic component 140, a press ring 150, and a seal ring 160. The top cover plate 110 has a first surface 111 and a second surface 112 facing away from each other in a thickness direction of the top cover plate 110. The top cover plate 110 has a first pole hole 113 passing through the first surface 111 and the second surface 112. The lower plastic component 120 is stacked on the second surface 112. A second pole hole 121 coaxial with the first pole hole 113 is defined in the lower plastic component. The second pole hole 121 has a greater diameter than that of the first pole hole 113. The pole 130 sequentially passes through the first pole hole 113 and the second pole hole 121. The upper plastic component 140 includes a connection portion 141 and an insertion portion 142 that are connected to each other. The connection portion 141 is disposed on the first surface 111, and the insertion portion 142 is arranged between the pole 130 and a hole wall of the first pole hole 113. A hole wall of a through hole of the press ring 150 is arranged around an end portion of the pole 130 extending out of the second pole hole 121. The press ring 150 abuts against a surface of the lower plastic component 120 facing away from the top cover plate 110. The seal ring 160 is disposed in the second pole hole 121. In the thickness direction of the top cover plate 110, a surface of the seal ring 160 sealingly abuts against the top cover plate 110, and another surface of the seal ring 160 sealingly abuts against the press ring 150. An inner side wall of the seal ring 160 sealingly abuts against an outer peripheral wall of the pole 130 or a side wall of the insertion portion 142. An outer side wall of the seal ring 160 sealingly abuts against a hole wall of the second pole hole 121.

The thickness direction of the top cover plate 110 refers to a direction indicated by an arrow X in FIG. 1, and the thickness direction of the top cover plate 110 mentioned below refers to the direction indicated by the arrow X. The press ring 150 is fixed to the end portion of the pole 130 extending out of the second pole hole 121, typically by welding. The seal ring 160 is made of plastic and insulating material, and the seal ring 160 may have various structures. For example, the seal ring 160 may have a square, circular, cross-shaped cross section, and the like. The cross section of the seal ring 160 refers to a cross section formed on the seal ring 160 by cutting the seal ring 160 in an axial direction of the seal ring 160.

In addition, the inner side wall of the seal ring 160 sealingly abuts against the outer peripheral wall of the pole 130 or the side wall of the insertion portion 142. It may be understood that, when the insertion portion 142 is longer and extends out of the first pole hole 113 towards the press ring 150, a distance between the insertion portion 142 and the press ring 150 is smaller. Therefore, after the inner side wall of the seal ring 160 sealingly abuts against the side wall of the insertion portion 142, a gap between the pole 130 and the second pole hole 121 can be closed. When the insertion portion 142 is shorter and an end portion of the insertion portion 142 facing towards the press ring 150 is flush with an end portion of the first pole hole 113 facing towards the press ring 15 or slightly extends out of the first pole hole 113, the distance between the insertion portion 142 and the press ring 150 is larger. Considering the sealing effect of the seal ring 160, the seal ring 160 sealingly abutting against the outer peripheral wall of the pole 130 can improve the sealing effect between the pole 130 and the second pole hole 121.

In this embodiment, the pole 130 passes through the first pole hole 113 and the second pole hole 121. The diameter of the second pole hole 121 is greater than the diameter of the first pole hole 113. The press ring 150 is arranged around the end portion of the pole 130 extending out of the second pole hole 121. Therefore, the top cover plate 110, a surface of the press ring 150 facing towards the top cover plate 110, the outer peripheral wall of the pole 130 or the side wall of the insertion portion 142, and the hole wall of the second pole hole 121 form a mounting space for mounting the seal ring 160. In addition, one surface of the seal ring 160 sealingly abuts against the top cover plate 110 and another surface of the seal ring 160 sealingly abuts against the press ring 150, the inner side wall of the seal ring 160 sealingly abuts against the outer peripheral wall of the pole 130 or the side wall of the insertion portion 142, and the outer side wall of the seal ring 160 sealingly abuts against the hole wall of the second pole hole 121. Therefore, the mounting space can be peripherally sealed. In contrast, in the manner in which the seal ring 160 has one surface sealingly abutting against the top cover plate 110 and another surface sealingly abutting against the press ring 150, insulation and sealing between the press ring 150 and the top cover plate 110 can be realized, but it is difficult to ensure sealing between the hole wall of the second pole hole 121 and the seal ring 160 and between the seal ring 160 and the pole 130, such that metal debris easily falls into the gap between the seal ring 160 and the pole 130 in a process of welding the press ring 150, resulting in a short circuit of the pole 130. Therefore, by sealingly abutting the inner side wall of the seal ring 160 against the outer peripheral wall of the pole 130 or the side wall of the insertion portion 142, and sealingly abutting the outer side wall of the seal ring 160 against the hole wall of the second pole hole 121, insulation and sealing between the top cover plate 110 and the press ring 150 can be realized in an axial direction of the first pole hole 113, and insulation and sealing between the second pole hole 121 and the pole 130 can be realized in a radial direction of the first pole hole 113, such that the short circuit in the pole 130 and the top cover plate 110 due to metal debris can be avoided, which improves the operation performance of the secondary battery 200.

It may be noted that, the axial direction of the first pole hole 113 refers to a direction indicated by arrow x1 in FIG. 3, that is, the thickness direction of the top cover plate 110, and the radial direction of the first pole hole 113 refers to a direction indicated by arrow x2 in FIG. 3.

In addition, it is worth noting that the seal ring 160 is disposed in the second pole hole 121. In the thickness direction of the top cover plate 110, one surface of the seal ring 160 sealingly abuts against the top cover plate 110, and another surface of the seal ring 160 sealingly abuts against the press ring 150. The inner side wall of the seal ring 160 sealingly abuts against the outer peripheral wall of the pole 130 or the side wall of the insertion portion 142. The outer side wall of the seal ring 160 sealingly abuts against the hole wall of the second pole hole 121. It may be understood that, after the press ring 150, the lower plastic component 120, the top cover plate 110, and the pole 130 are completely mounted, the seal ring 160 is pressed to be plastically deformed by the top cover plate 110 and the press ring 150. One surface of the plastically deformed seal ring 160 sealingly abuts against the top cover plate 110, and another surface of the plastically deformed seal ring 160 sealingly abuts against the press ring 150. The inner side wall of the seal ring 160 sealingly abuts against the outer peripheral wall of the pole 130 or the side wall of the insertion portion 142, and the outer side wall of the seal ring 160 sealingly abuts against the hole wall of the second pole hole 121.

Figure 4:
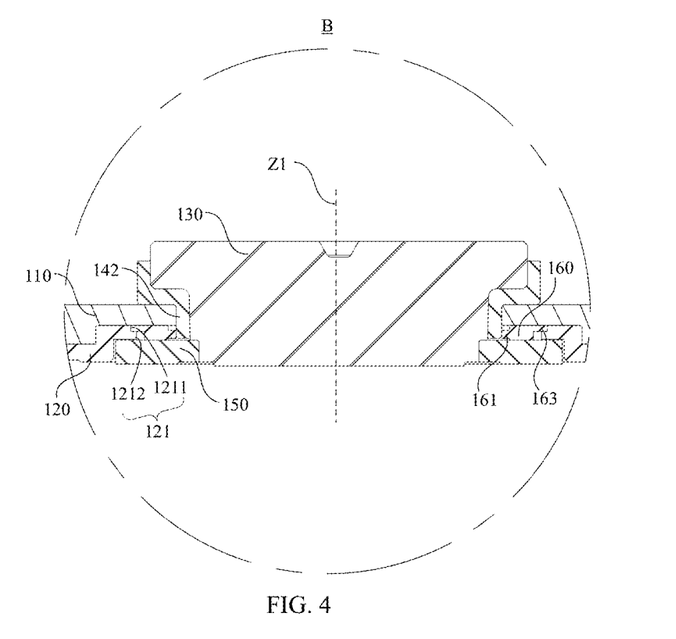
FIG. 4 is a second partially enlarged schematic view of part B in FIG. 2.

In order to enable the inner side wall of the seal ring 160 to sealingly abut against the outer peripheral wall of the pole 130 or the side wall of the insertion portion 142, and the outer side wall of the seal ring 160 to sealingly abut against the hole wall of the second pole hole 121, in some possible embodiments, as shown in FIG. 4, the second pole hole 121 includes a large end hole 1211 and a small end hole 1212 connected to each other. The large end hole 1211 is closer to the top cover plate 110. The inner side wall of the seal ring 160 is provided with a first protrusion 161 protruding towards a central axis of the second pole hole 121 (i.e., an axis Z1 shown in FIG. 4). The first protrusion 161 sealingly abuts against the outer peripheral wall of the pole 130 or the side wall of the insertion portion 142. The outer side wall of the seal ring 160 closer to an end portion of the top cover plate 110 is provided with a lap-joint protrusion 163 protruding away from the central axis of the second pole hole 121. In the thickness direction of the top cover plate 110, a surface of the lap-joint protrusion 163 sealingly abuts against the top cover plate 110, and another surface of the lap-joint protrusion 163 sealingly abuts against a bottom wall of the large end hole 1211.

Thus, by providing the first protrusion 161, when the press ring 150 and the top cover plate 110 press the seal ring 160, the first protrusion 161 can closely abut against the outer peripheral wall of the pole 130 or the side wall of the insertion portion 142, thereby achieving sealing between the seal ring 160 and the pole 130. In addition, by sealingly abutting one surface of the lap-joint protrusion 163 against the top cover plate 110 and another surface of the lap-joint protrusion 163 against the bottom wall of the large end hole 1211, the lap-joint protrusion 163 is tightly contacted with a step surface between the large end hole 1211 and the small end hole 1212 when the press ring 150 presses the seal ring 160. In this way, sealing between the seal ring 160 and the second pole hole 121 is realized.

In addition, since one surface of the lap-joint protrusion 163 abuts against the top cover plate 110 and another surface of the lap-joint protrusion 163 abuts against the bottom wall of the large end hole 1211 in the thickness direction of the top cover plate 110, the debris on the press ring 150 is prevented from contacting the top cover plate 110 and causing a short circuit in the top cover plate 110.

In addition, by arranging the large end hole 1211 to be closer to the top cover plate 110, on the one hand, the mounting of the seal ring 160 and the lower plastic component 120 can be facilitated, and on the other hand, an abutting force between the lap-joint protrusion 163 and the step surface can be increased due to the pressure from the top cover plate 110, thereby improving the sealing effect between the seal ring 160 and the second pole hole 121.

In other embodiments of the present disclosure, if the convenience of mounting the seal ring 160 and the lower plastic component 120 is not considered, a groove may be formed on the hole wall of the second pole hole 121, allowing the lap-joint protrusion 163 to extend into the groove.

Figure 5:
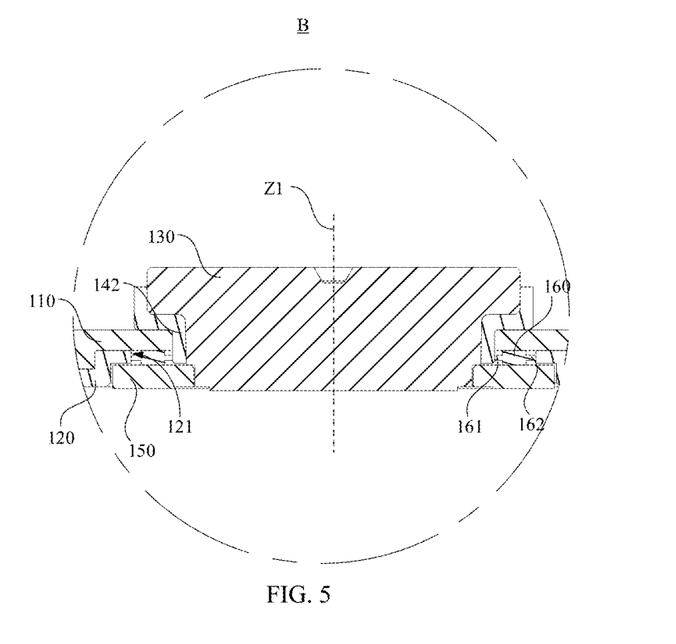
FIG. 5 is a third partially enlarged schematic view of part B in FIG. 2.

In other possible embodiments, referring to FIG. 5, the inner side wall of the seal ring 160 is provided with a first protrusion 161 protruding towards a central axis of the second pole hole 121. The outer side wall of the seal ring 160 is provided with a second protrusion 162 protruding away from the central axis of the second pole hole 121. The first protrusion 161 sealingly abuts against the outer peripheral wall of the pole 130 or the side wall of the insertion portion 142. The second protrusion 162 sealingly abuts against the hole wall of the second pole hole 121.

In this way, when the press ring 150 and the pole 130 are fixed by welding, the press ring 150 exerts a pressure on the seal ring 160 towards the top cover plate 110, and the top cover plate 110 exerts a pressure on the seal ring 160 towards the press ring 150. Therefore, plastic deformation occurs in the seal ring 160. In addition, since the first protrusion 161 sealingly abuts against the outer peripheral wall of the pole 130 or the side wall of the insertion portion 142, and the second protrusion 162 sealingly abuts against the hole wall of the second pole hole 121, an abutting force between the first protrusion 161 and the pole 130 or insertion portion 142 is increased when the seal ring 160 is plastically deformed due to pressure. Similarly, an abutting force between the second protrusion 162 and the second pole hole 121 is increased, thereby improving the sealing effect of the seal ring 160 in the radial direction of the first pole hole 113. Thus, the metal debris on the press ring 150 is prevented from connecting with the pole 130 or top cover plate 110, thus avoiding a short circuit in the top cover plate 110 or pole 130.

Furthermore, by providing the first protrusion 161 and the second protrusion 162, on the one hand, a width of the seal ring 160 in the radial direction of the first pole hole 113 can be reduced, thereby increasing a deformation range of the seal ring 160 and improving the sealing effect of the seal ring 160. On the other hand, in a process of mounting the press ring 150, the first protrusion 161 and the second protrusion 162 can seal between the seal ring 160 and the hole wall of the second pole hole 121 and between the seal ring 160 and the pole 130 or insertion portion 142, respectively, so as to prevent metal debris on the press ring 150 from falling off.

In some possible embodiments, referring to FIG. 5, an end portion of the first protrusion 161 away from the central axis of the second pole hole 121 and an end portion of the second protrusion 162 facing towards the central axis of the second pole hole 121 are planes.

The plane refers to the end portion of the first protrusion 161 away from the central axis of the second pole hole 121 and the end portion of the second protrusion 162 facing towards the central axis of the second pole hole 121 in the axial direction of the first pole hole 113 being planar.

In this way, contact areas between the first protrusion 161 and the outer peripheral wall of the pole 130 or the side wall of the insertion portion 142 and between the second protrusion 162 and the second pole hole 121 are increased, thereby further improving the sealing effect of the seal ring 160.

In other embodiments of the present disclosure, the end portion of the first protrusion 161 away from the central axis of the second pole hole 121 and the end portion of the second protrusion 162 facing towards the central axis of the second pole hole 121 may be curved surfaces. Since the curved surface is convex relative to the first protrusion 161 or the second protrusion 162, the abutting force between the first protrusion 161 and the outer peripheral wall of the pole 130 or the side wall of the insertion portion 142 and between the second protrusion 162 and the second pole hole 121 can be improved. Thereby, the sealing effect between the first protrusion 161 and the outer peripheral wall of the pole 130 or the side wall of the insertion portion 142 and between the second protrusion 162 and the second pole hole 121 is improved.

Figure 6:
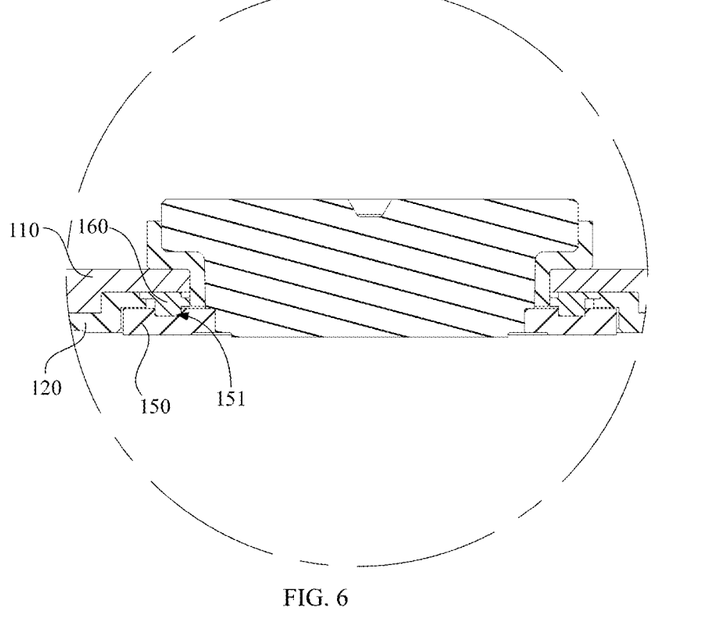
FIG. 6 is a fourth partially enlarged schematic view of part B in FIG. 2.

In some possible embodiments, referring to FIG. 6, an embed slot 151 is formed at a side of the press ring 150 facing towards the top cover plate 110, and a side of the seal ring 160 facing away from the top cover plate 110 is embedded in the embed slot 151.

By providing the embed slot 151 on the press ring 150, the side of the seal ring 160 away from the top cover plate 110 is embedded in the embed slot 151 to perform pre-positioning on the press ring 150 when mounting the press ring 150. Therefore, the mounting accuracy of the press ring 150 is improved, and meanwhile, twisting of the seal ring 160 in the process of mounting the press ring 150, which influences the sealing effect between the first protrusion 161 and the insertion portion 142 or the pole 130 and between the second protrusion 162 and the second pole hole 121, can be avoided.

Figure 7:
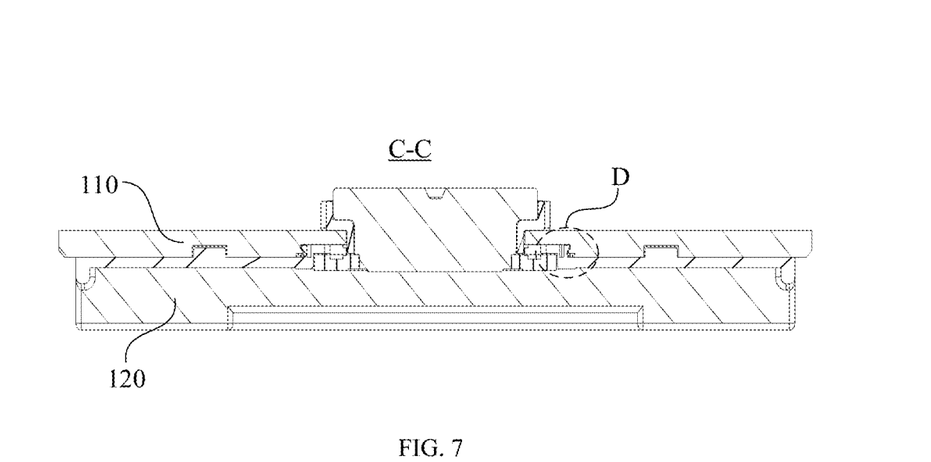
FIG. 7 is a cross-sectional view taken along C-C in FIG. 1.
Figure 8:
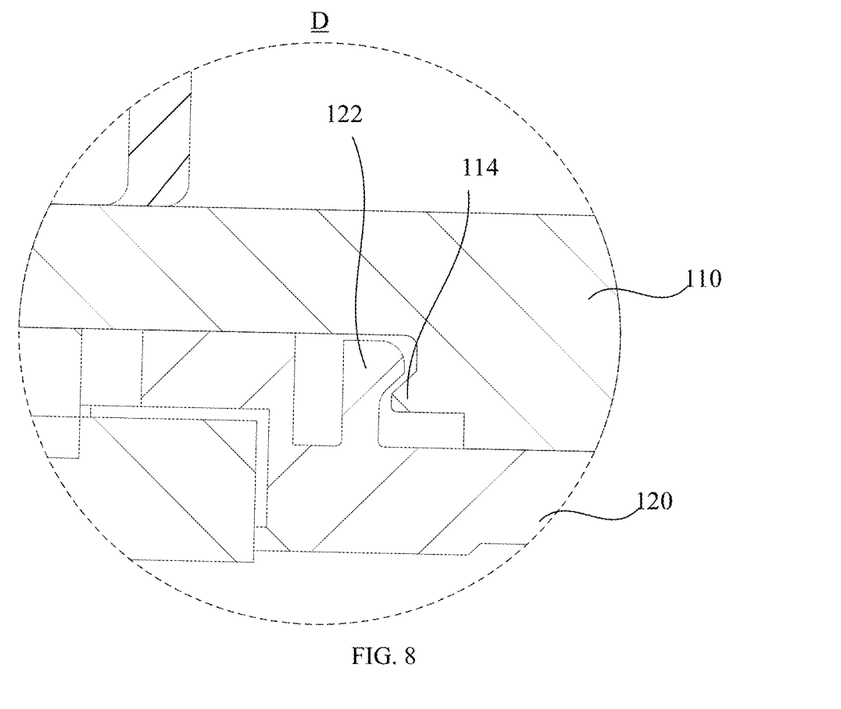
FIG. 8 is a partially enlarged schematic view of part D in FIG. 7.
Figure 9:
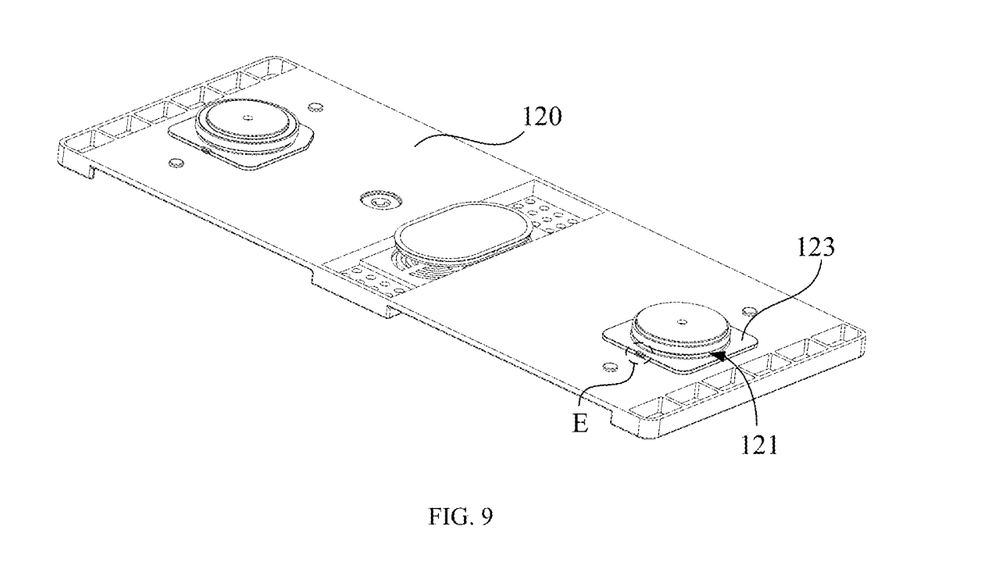
FIG. 9 is a schematic view of a structure of a lower plastic component engaging with a pole according to an embodiment of the present disclosure.

In some possible embodiments, referring to FIG. 7 and FIG. 8, a lock tab 114 is disposed at the top cover plate 110. A lock latch 122 is disposed at the lower plastic component 120, and the lock latch 122 is configured to engage with the lock tab 114 to lock the lower plastic component 120 to the top cover plate 110.

Therefore, the lower plastic component 120 can be fixedly mounted to the top cover plate 110 through the engagement between the lock tab 114 and the lock latch 122, improving the mounting stability between the lower plastic component 120 and the top cover plate 110.

The lock tab 114 may be disposed at various positions on the top cover plate 110 and the lock latch 122 may be disposed at various positions on the lower plastic component 120, as long as the lock latch 122 and the lock tab 114 can be engaged with each other.

In some possible embodiments, referring to FIG. 9 to FIG. 12, an avoidance groove 115 is defined in the second surface 112, and the avoidance groove 115 surrounds the first pole hole 113. The lock tab 114 is located at a groove wall of the avoidance groove 115 and protrudes towards a central axis of the first pole hole 113 relative to the groove wall. Transition recesses 116 are formed at opposite sides of the lock tab 114 in a circumferential direction of the first pole hole 113. The transition recess 116 is recessed relative to the groove wall of the avoidance groove 115 in a direction away from the central axis of the first pole hole 113. A boss 123 is disposed on the surface of the lower plastic component 120 facing towards the top cover plate 110. The boss 123 surrounds the periphery of the second pole hole 121 and is configured to engage with the avoidance groove 115. The lock latch 122 is disposed closer to an edge of the boss 123.

The lock tab 114 is located at the groove wall of the avoidance groove 115 and protrudes towards the central axis of the first pole hole 113 relative to the groove wall. The lock latch 122 is disposed closer to the edge of the boss 123. In the circumferential direction of the first pole hole 113, the transition recesses 116 are formed at opposite sides of the lock tab 114, and the transition recesses 116 are recessed relative to the groove wall of the avoidance groove 115 in the direction away from the central axis of the first pole hole 113. Therefore, on the one hand, compared with providing the lock latch 122 on the boss 123, a gap between the lower plastic component 120 and the top cover plate 110 is reduced when the lock latch 122 is engaged with the lock tab 114, and sealing between the lower plastic component 120 and the top cover plate 110 is improved. On the other hand, in a process of mounting the lower plastic component 120 to the top cover plate 110 and engaging the lock latch 122 with the lock tab 114, the transition recesses 116 can avoid abrasion of the lock tab 114 in the circumferential direction of the first pole hole 113, thus improving the effect and stability of the engagement between the lock tab 114 and the lock latch 122.

In addition, in another exemplary embodiment of the present disclosure, a plurality of lock tabs 114 is provided. The plurality of lock tabs 114 is symmetrically arranged about the central axis of the first pole hole 113. A plurality of lock latches 122 is provided. The plurality of lock latches 122 respectively corresponds to the plurality of lock tabs 114. Thus, the stability of the engagement between the lower plastic component 120 and the top cover plate 110 can be further improved.

In other embodiments of the present disclosure, a groove may further be formed at a surface of the upper plastic component 140 facing towards the top cover plate 110, and a convex column may be disposed on a surface of the top cover plate 110 facing towards the lower plastic component 120. Therefore, the engagement between the upper plastic component 140 and the top cover plate 110 may be realized by engaging the convex column with the groove.

Figure 10:
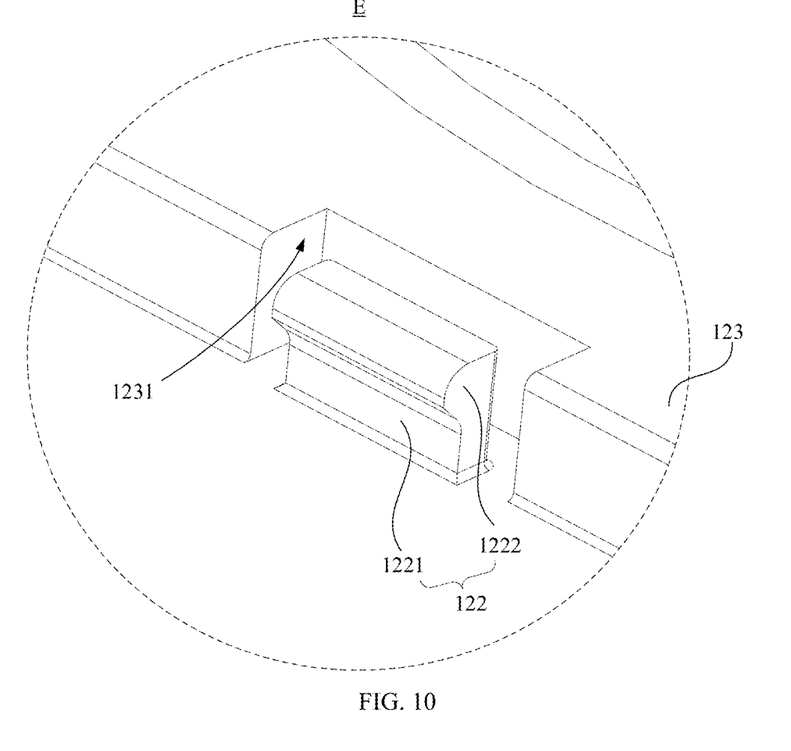
FIG. 10 is a partially enlarged schematic view of part E in FIG. 9.
Figure 11:
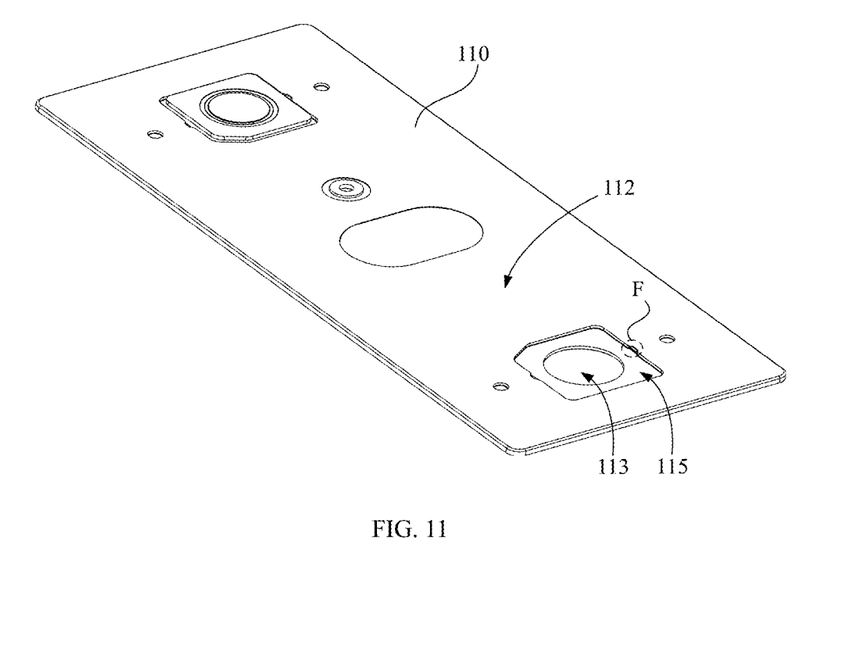
FIG. 11 is a schematic view of a structure of a top cover plate according to an embodiment of the present disclosure.
Figure 12:
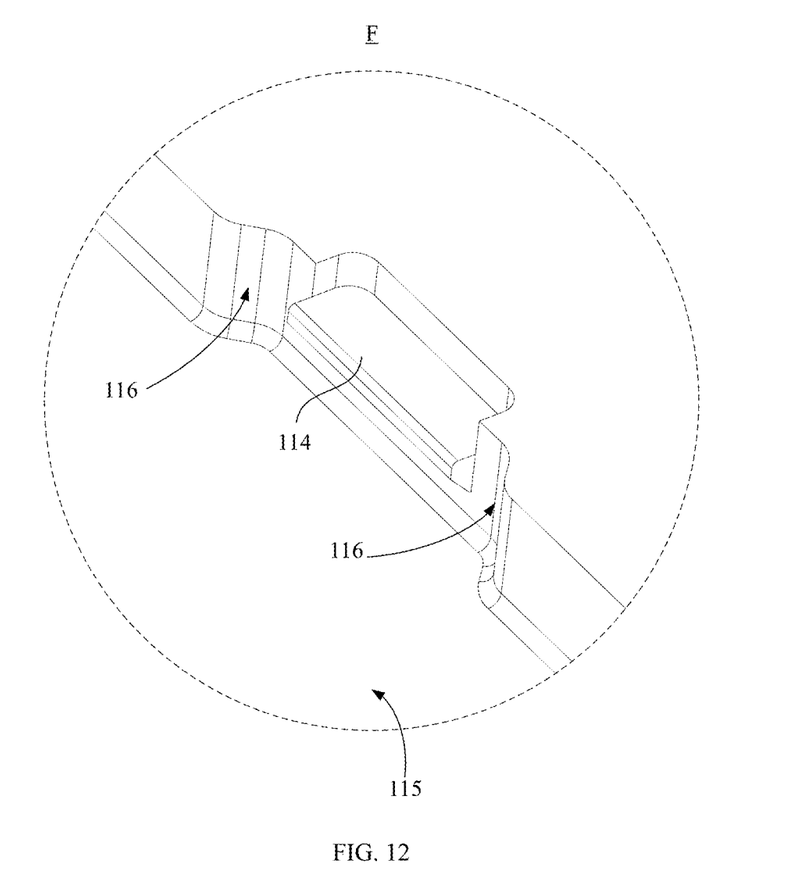
FIG. 12 is a partially enlarged schematic view of part F in FIG. 11.

In some possible embodiments, referring to FIG. 10, an avoidance slot 1231 is formed at an outer peripheral wall of the boss 123. The lock latch 122 includes a neck 1221 and a lock protrusion 1222 that are connected to each other. The neck 1221 is connected to lower plastic component 120 and is at least partially located in the avoidance slot 1231. An avoidance gap is formed between the neck 1221 and a slot wall of avoidance slot 1231. The lock protrusion 1222 is configured to engage with the lock tab 114 and protrudes out of the outer peripheral wall of the boss 123.

Therefore, in a process of mounting the lower plastic component 120 to the top cover plate 110 and engaging the lock tab 114 with the lock protrusion 1222, the lock protrusion 1222 deforms towards the direction of the central axis of the first pole hole 113 until the lock protrusion 1222 is restored after the lock tab 114 is engaged with the lock protrusion 1222. The avoidance gap between the neck 1221 and the slot wall of the avoidance slot 1231 facilitates a locking engagement between the lock tab 114 and the lock latch 122. In addition, the neck 1221 is connected to the lower plastic component 120 and at least partially positioned in the avoidance slot 1231, such that an engagement gap between the avoidance groove 115 and the boss 123 can be reduced, thereby improving the sealing between the lower plastic component 120 and the top cover plate 110.

In some possible embodiments, as shown in FIG. 10, the lock protrusion 1222 is lower than the boss 123 in the thickness direction of the top cover plate 110.

The fact that the lock protrusion 1222 is lower than the boss means that an end portion of the lock protrusion 1222 facing towards the top cover plate 110 is lower than the plane of the boss 123 facing towards the top cover plate 110.

If the lock protrusion 1222 is higher than the boss 123 in the thickness direction of the top cover plate 110, after the lower plastic component 120 is mounted to the top cover plate 110 and the lock protrusion 1222 is engaged with the lock tab 114, a gap exists between the surface of the lower plastic component 120 facing towards the top cover plate 110 and the surface of the top cover plate 110 facing towards the lower plastic component 120, which affects the sealing between the lower plastic component 120 and the top cover plate 110. By providing the lock protrusion 1222 lower than the boss 123 in the thickness direction of the top cover plate 110, the lower plastic component 120 can tightly abut against the top cover plate 110, thereby improving the sealing of the top cover assembly 100 and further improving the performance of the secondary battery 200.

Figure 13:
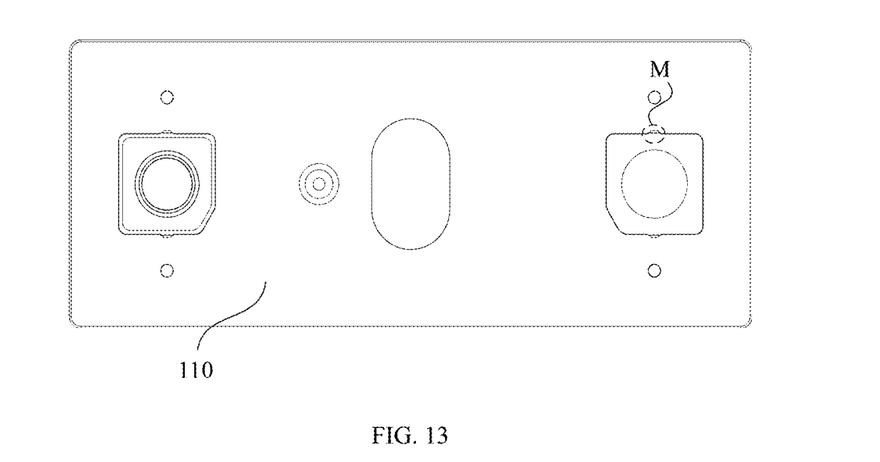
FIG. 13 is a front view of a top cover plate according to an embodiment of the present disclosure.
Figure 14:
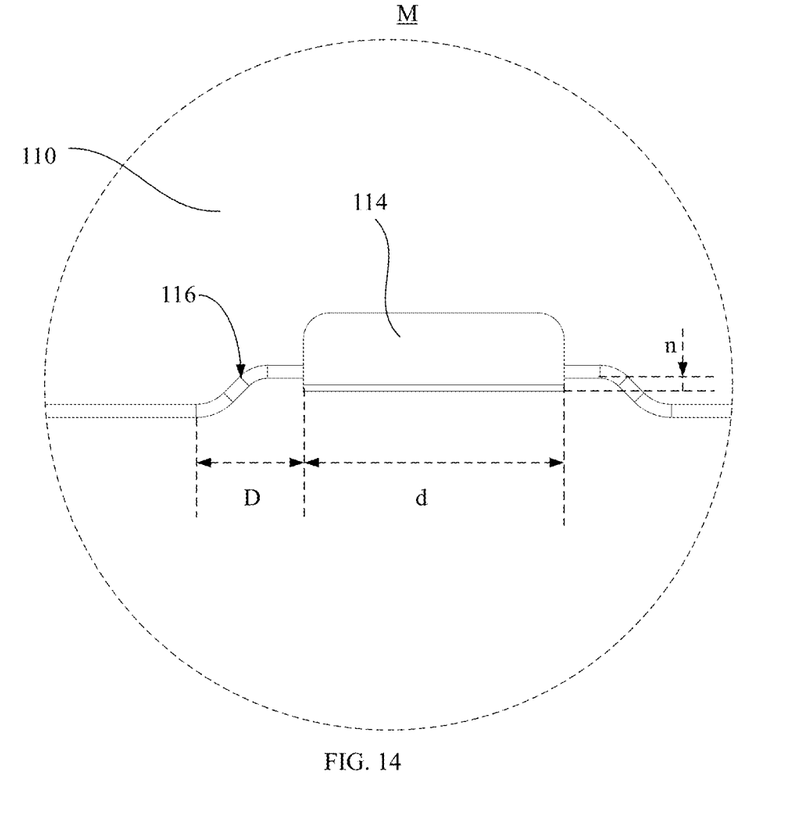
FIG. 14 is a partially enlarged schematic view of part M in FIG. 13.

In some possible embodiments, referring to FIG. 13 and FIG. 14, in the circumferential direction of the first pole hole 113, a width D of the transition recess 116 and a width d of the lock tab satisfy D/d=¼.

The width of the transition recess 116 in the circumferential direction of the first pole hole 113 refers to a distance between an edge of the lock tab 114 and an edge of the transition recess 116 adjacent to the edge of the lock tab 114 at a side away from the lock tab 114.

If a ratio of the width of the transition recess 116 to the width of the lock tab 114 is smaller than ¼, the width of the transition recess 116 will be shorter and the width of the lock tab 114 will be longer, which will easily lead to abrasion in a process of engaging the lock tab 114 and the lock latch 122. If the ratio of the width of the transition recess 116 to the width of the lock tab 114 is greater than ¼, the width of the transition recess 116 will be longer and the width of the lock tab 114 will be shorter. Although the transition recess 116 can effectively prevent the lock tab 114 from being worn in the circumferential direction of the first pole hole 113, the short width of the lock tab 114 affects the locking strength between the lock tab 114 and the lock latch 122, thereby affecting the connection stability between the lower plastic component 120 and the top cover plate 110. Based on this, D/d=¼, such that abrasion can be avoided in the process of locking engagement between the lock tab 114 and the lock latch 122, and locking strength between the lock tab 114 and the lock latch 122 can be ensured, thereby ensuring the performance of the secondary battery 200.

For example, in the circumferential direction of the first pole hole 113, the width of the lock tab 114 is 20 mm, and the width of the transition recess 116 is 10 mm. It may be noted that, specific values of the width of the lock tab 114 and the width of the transition recess 116 are illustrated here as an example, and should not be understood as limiting the width range of the lock tab 114 and the transition recess 116.

In some possible embodiments, as shown in FIG. 14, in a radial direction of the first pole hole 113, a distance n that the lock tab 114 protrudes from a bottom wall of the transition recess 116 away from the central axis of the first pole hole 113 satisfies 0.05 mm≤n≤0.5 mm.

If the distance that the lock tab 114 protrudes from the bottom wall of the transition recess 116 away from the central axis of the first pole hole 113 is smaller than 0.05 mm, the lock tab 114 and the lock latch 122 are easily disengaged, thereby affecting the stability of the lower plastic component 120 mounted to the top cover plate 110. If the distance that the lock tab 114 protrudes from the bottom wall of the transition recess 116 away from of the central axis of the first pole hole 113 is greater than 0.5 mm, on the one hand, since a protruding length of the lock tab 114 is relatively long, the difficulty of locking engagement between the lock latch 122 and the lock tab 114 is increased; on the other hand, in a process of engaging the lock tab 114 with the lock latch 122, since the deformation range of the lock tab 114 or the lock latch 122 is relatively large, the lock tab 114 or the lock latch 122 is easy to crack due to stress concentration, thereby affecting the engaging strength between the lock tab 114 and the lock latch 122. Based on this, 0.05 mm≤n≤0.5 mm, such that the difficulty of locking engagement between the lock latch 122 and the lock tab 114 can be reduced, and the engaging strength between the lock latch 122 and the lock tab 114 can be ensured.

Figure 15:
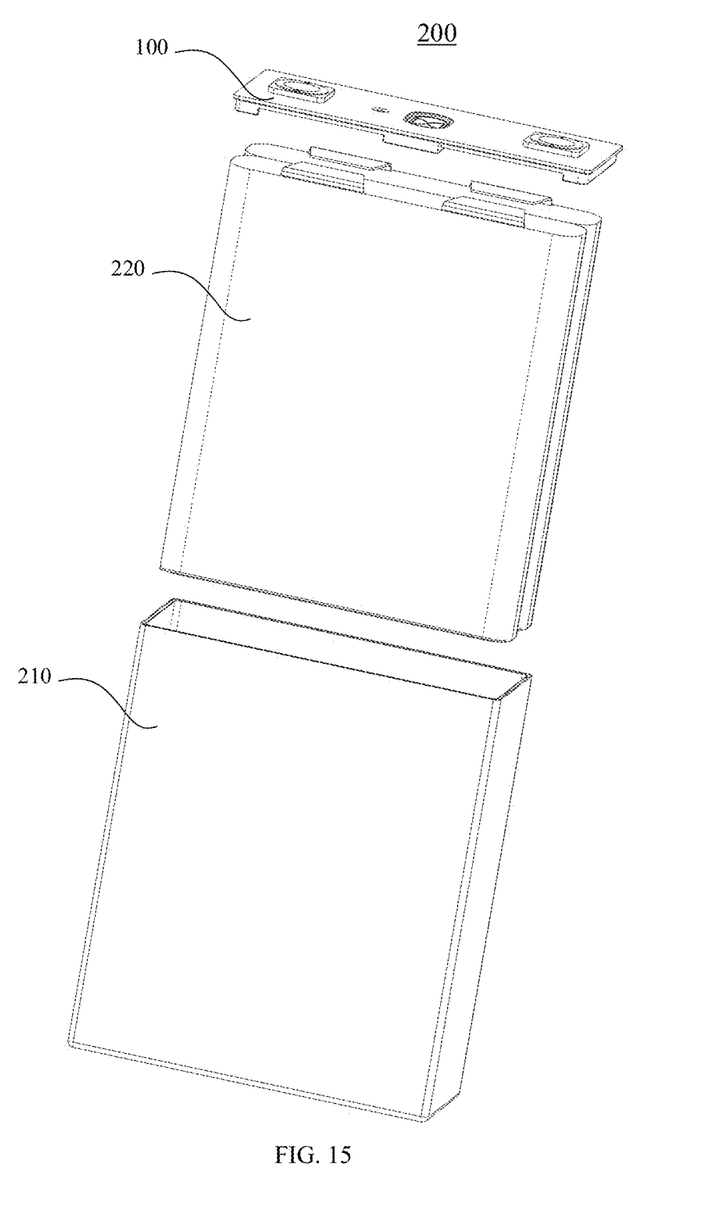
FIG. 15 is an exploded view of a secondary battery according to an embodiment of the present disclosure.

Referring to FIG. 15, an embodiment of the present disclosure further provides a secondary battery 200. The secondary battery 200 includes a housing 210, an electrode assembly 220, and the top cover assembly 100 in the above embodiments. The housing 210 includes an accommodation cavity having an opening. The electrode assembly 220 is mounted in the accommodation cavity. The opening is covered by the top cover assembly 100.

A structure of the top cover assembly 100 in the embodiment of the present disclosure may be the same as that of any one of the top cover assemblies 100 in the above embodiments, and the same or similar beneficial effects may be brought about. For details, reference may be made to the description in the above embodiments, and the embodiments of the present disclosure are not repeated here.

Since the secondary battery 200 includes the top cover assembly 100 in the above embodiment, and the top cover plate 110 and the pole 130 in the top cover assembly 100 have good insulation, the service performance of the secondary battery 200 is improved.

The secondary battery 200 may be a lithium-ion battery or a lithium manganese battery.

Figure 16:
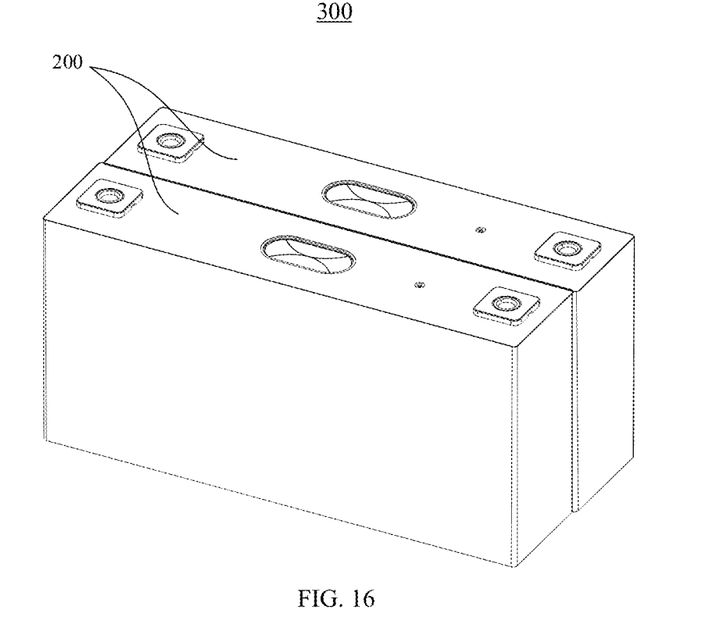
FIG. 16 is a schematic view of a structure of a battery module according to an embodiment of the present disclosure.

Referring to FIG. 16, an embodiment of the present disclosure further provides a battery module 300 including at least one secondary battery 200 in the above embodiment.

Since the battery module 300 includes the secondary battery 200 in the above embodiment, the battery module 300 has better performance.

For example, the battery module 300 includes a number of secondary batteries 200 such as 6, 7, 8 secondary batteries 200, etc., which are sequentially arranged, and each two adjacent secondary batteries 200 are electrically connected to each other.

Figure 17:
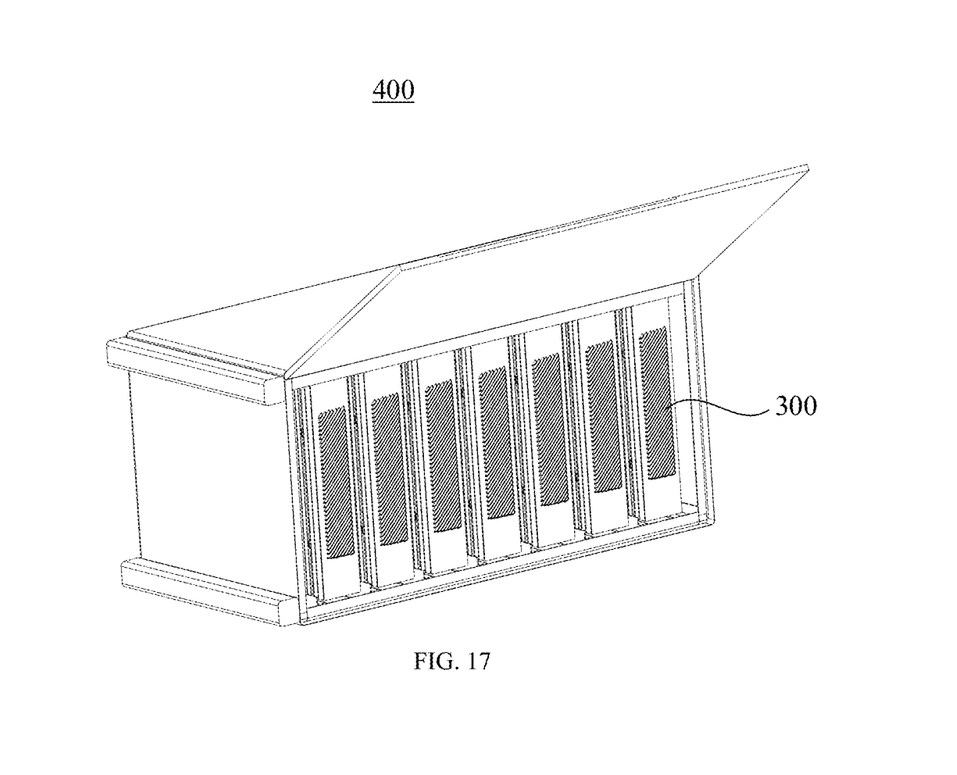
FIG. 17 is a schematic view of a structure of an electricity-consumption device according to an embodiment of the present disclosure.

Referring to FIG. 17, an embodiment of the present disclosure also includes an electricity-consumption device 400 including the battery module 300 in the above embodiment.

The electricity-consumption device 400 may be an energy storage container, a new energy vehicle, and the like.

Since the electricity-consumption device 400 includes the battery module 300 in the above embodiment, a power function of the electricity-consumption device 400 is improved.

Finally, it may be noted that, each of the above embodiments is used only to illustrate, rather than to limit, the technical solutions of the present disclosure. Although the present disclosure has been described in detail with reference to the foregoing embodiments, it is conceivable for those skilled in the art that modifications can be made to the technical solutions described in the foregoing embodiments, or equivalent replacements can be made to some or all of the technical features in the technical solutions described in the foregoing embodiments. These modifications or equivalent replacements are do not depart the essence of corresponding technical solutions from the scope of the technical solutions of the embodiments of the present disclosure.

What is claimed is:
1. A top cover assembly, comprising:
  a top cover plate having a first surface and a second surface facing away from each other in a thickness direction of the top cover plate, and a first pole hole passing through the first surface and the second surface;

a lower plastic component stacked on the second surface, a second pole hole coaxial with the first pole hole being defined in the lower plastic component, the second pole hole having a greater diameter than that of the first pole hole;

a pole sequentially passing through the first pole hole and the second pole hole;

an upper plastic component comprising a connection portion and an insertion portion that are connected to each other, the connection portion being disposed on the first surface, and the insertion portion being arranged between the pole and a hole wall of the first pole hole;

a press ring abutting against a surface of the lower plastic component facing away from the top cover plate, a hole wall of a through hole of the press ring being arranged around an end portion of the pole extending out of the second pole hole; and a seal ring disposed in the second pole hole, in the thickness direction of the top cover plate, a surface of the seal ring sealingly abutting against the top cover plate, and another surface of the seal ring sealingly abutting against the press ring; an inner side wall of the seal ring sealingly abutting against an outer peripheral wall of the pole or a side wall of the insertion portion, and an outer side wall of the seal ring sealingly abutting against a hole wall of the second pole hole, the inner side wall of the seal ring being provided with a first protrusion protruding towards a central axis of the second pole hole, an end portion of the first protrusion facing towards the central axis of the second pole hole being a plane, wherein an embed slot is formed at a side of the press ring facing towards the top cover plate, a side of the seal ring facing away from the top cover plate being embedded in the embed slot;

an avoidance groove is defined in the second surface, the avoidance groove surrounding the first pole hole, and having a groove wall facing a central axis of the first pole hole;

a plurality of first grooves are formed at the groove wall of the avoidance groove and are recessed relative to the groove wall of the avoidance groove in a direction away from the central axis of the first pole hole;

a lock tab is disposed in each of the plurality of first grooves, the lock tab protruding towards the central axis of the first pole hole relative to a groove wall of the first groove, an outer edge of the lock tab being further away from the central axis of the first pole hole relative to the groove wall of the avoidance groove;

transition recesses are formed at opposite sides of the lock tab in a circumferential direction of the first pole hole, the transition recesses connecting the groove wall of the avoidance groove and the groove wall of each of the plurality of first grooves, and being recessed relative to the groove wall of the avoidance groove in a direction away from the central axis of the first pole hole;

in the circumferential direction of the first pole hole, a width D of the transition recess and a width d of the lock tab satisfy $D/d=¼$;

in a radial direction of the first pole hole, a distance n that the lock tab protrudes from a bottom wall of the transition recess away from the central axis of the first pole hole satisfies $0.05 \text{ mm} \leq n \leq 0.5 \text{ mm}$;

a boss is disposed on a surface of the lower plastic component facing towards the top cover plate, the boss being configured to engage with the avoidance groove, the second pole hole passing through the boss;

a plurality of avoidance slots are formed at an outer peripheral wall of the boss that faces away from the central axis of the second pole hole, the plurality of avoidance slots being in one-to-one correspondence with the plurality of first grooves, and each having a slot wall that is recessed relative to the outer peripheral wall of the boss in a direction towards the central axis of the second pole hole;

a lock latch is disposed at the lower plastic component in each of the plurality of avoidance slots, and the lock latch is configured to engage with the lock tab to lock the lower plastic component to the top cover plate; and the lock latch comprises a neck and a lock protrusion that are connected to each other, the neck being connected to the lower plastic component and at least partially located in the corresponding avoidance slot, an avoidance gap being formed between the neck and the slot wall of the corresponding avoidance slot, and the lock protrusion being configured to engage with the lock tab and protruding out of the outer peripheral wall of the boss, wherein the lock protrusion is lower than the boss in the thickness direction of the top cover plate.

2. A secondary battery, comprising:

a housing comprising an accommodation cavity having an opening;

an electrode assembly mounted in the accommodation cavity; and a top cover assembly, the opening is covered by the top cover assembly, wherein the top cover assembly comprises:

a top cover plate having a first surface and a second surface facing away from each other in a thickness direction of the top cover plate, and a first pole hole passing through the first surface and the second surface;

a lower plastic component stacked on the second surface, a second pole hole coaxial with the first pole hole being defined in the lower plastic component, the second pole hole having a greater diameter than that of the first pole hole;

a pole sequentially passing through the first pole hole and the second pole hole;

an upper plastic component comprising a connection portion and an insertion portion that are connected to each other, the connection portion being disposed on the first surface, and the insertion portion being arranged between the pole and a hole wall of the first pole hole;

a press ring abutting against a surface of the lower plastic component facing away from the top cover plate, a hole wall of a through hole of the press ring being arranged around an end portion of the pole extending out of the second pole hole; and a seal ring disposed in the second pole hole, in the thickness direction of the top cover plate, a surface of the seal ring sealingly abutting against the top cover plate, and another surface of the seal ring sealingly abutting against the press ring; an inner side wall of the seal ring sealingly abutting against an outer peripheral wall of the pole or a side wall of the insertion portion, and an outer side wall of the seal ring sealingly abutting against a hole wall of the second pole hole, the inner side wall of the seal ring being provided with a first protrusion protruding towards a central axis of the second pole hole, an end portion of the first protrusion facing towards the central axis of the second pole hole being a plane, wherein an embed slot is formed at a side of the press ring facing towards the top cover plate, a side of the seal ring facing away from the top cover plate being embedded in the embed slot;

an avoidance groove is defined in the second surface, the avoidance groove surrounding the first pole hole, and having a groove wall facing a central axis of the first pole hole;

a plurality of first grooves are formed at the groove wall of the avoidance groove and are recessed relative to the groove wall of the avoidance groove in a direction away from the central axis of the first pole hole;

a lock tab is disposed in each of the plurality of first grooves, the lock tab protruding towards the central axis of the first pole hole relative to a groove wall of the first groove, an outer edge of the lock tab being further away from the central axis of the first pole hole relative to the groove wall of the avoidance groove;

transition recesses are formed at opposite sides of the lock tab in a circumferential direction of the first pole hole, the transition recesses connecting the groove wall of the avoidance groove and the groove wall of each of the plurality of first grooves, and being recessed relative to the groove wall of the avoidance groove in a direction away from the central axis of the first pole hole;

in the circumferential direction of the first pole hole, a width D of the transition recess and a width d of the lock tab satisfy $D/d=1/4$;

in a radial direction of the first pole hole, a distance n that the lock tab protrudes from a bottom wall of the transition recess away from the central axis of the first pole hole satisfies $0.05\ mm \leq n \leq 0.5\ mm$;

a boss is disposed on a surface of the lower plastic component facing towards the top cover plate, the boss being configured to engage with the avoidance groove, the second pole hole passing through the boss;

a plurality of avoidance slots are formed at an outer peripheral wall of the boss that faces away from the central axis of the second pole hole, the plurality of avoidance slots being in one-to-one correspondence with the plurality of first grooves, and each having a slot wall that is recessed relative to the outer peripheral wall of the boss in a direction towards the central axis of the second pole hole;

a lock latch is disposed at the lower plastic component in each of the plurality of avoidance slots, and the lock latch is configured to engage with the lock tab to lock the lower plastic component to the top cover plate; and the lock latch comprises a neck and a lock protrusion that are connected to each other, the neck being connected to the lower plastic component and at least partially located in the corresponding avoidance slot, an avoidance gap being formed between the neck and the slot wall of the corresponding avoidance slot, and the lock protrusion being configured to engage with the lock tab and protruding out of the outer peripheral wall of the boss, wherein the lock protrusion is lower than the boss in the thickness direction of the top cover plate.

3. A battery module, comprising at least one secondary battery according to claim 2.

4. An electricity-consumption device, comprising the battery module according to claim 3.

5. The top cover assembly according to claim 1, wherein:
the second pole hole comprises a large end hole and a small end hole connected to each other, the large end hole being closer to the top cover plate;
the first protrusion sealingly abutting against the outer peripheral wall of the pole or the side wall of the insertion portion; and
the outer side wall of the seal ring closer to an end portion of the top cover plate is provided with a lap-joint protrusion protruding away from the central axis of the second pole hole, in the thickness direction of the top cover plate, a surface of the lap-joint protrusion sealingly abutting against the top cover plate and another surface of the lap-joint protrusion sealingly abutting against a bottom wall of the large end hole.

6. The top cover assembly according to claim 1, wherein:
the outer side wall of the seal ring is provided with a second protrusion protruding away from the central axis of the second pole hole, the first protrusion sealingly abutting against the outer peripheral wall of the pole or the side wall of the insertion portion, and the second protrusion sealingly abutting against the hole wall of the second pole hole.

* * * * *